March 3, 1936. H. J. LITTLE Re. 19,880

SHEET METAL ROOFING AND SIMILAR CONSTRUCTION

Original Filed May 12, 1934

INVENTOR.
Howard J. Little
BY Geo. W. Mills Jr.
ATTORNEY.

Reissued Mar. 3, 1936 Re. 19,880

UNITED STATES PATENT OFFICE 19,880

SHEET METAL ROOFING AND SIMILAR CONSTRUCTION

Howard J. Little, Fort Thomas, Ky., assignor to The Globe Iron Roofing & Corrugating Company, a corporation of Delaware Original No. 2,004,052, dated June 4, 1935, Serial No. 725,361, May 12, 1934. Application for reissue July 2, 1935, Serial No. 29,548

36 Claims. (Cl. 108—18)

This invention relates to sheet metal construction, particularly to a metal roofing or like construction in which it is usual to have the adjacent edges of metal sheet roofing lapping to form joints. One of the objects of this invention is to provide a joint, formed by the lapped edges, in which there is provided a plurality of passageways or channels to conduct any water down through the passageways or channels into the gutter of the roof. The invention provides a means of preventing any water by any siphoning action or by means of capillary attraction getting under the metal sheets and causing a leakage in the roof.

The invention provides means for a water seal being formed in the bottom of the valley between corrugations on the lower sheet due to the contact of the valley on the upper sheet with the valley on the lower sheet and thereby further prevent water from the valley passing over the next corrugation.

The invention also provides corrugations on adjacent sheets arranged so that the apex of each corrugation contacts with the apex on the corrugations of the sheet below it, while at the same time providing the maximum strength by reason of the apex of each corrugation being supported by two legs, the lower ends of which rest upon the foundation upon which the sheets are laid or upon the foundation through the medium of the thickness of the sheet below. This provides for a seam between adjacent sheets formed by the corrugations which is not only waterproof but which gives the maximum strength to each of the corrugations forming the seam to withstand weight placed upon the apex of the corrugations by workmen walking over the roof or otherwise.

This invention also provides a beading which extends across the sheet at an angle to the corrugations heretofore referred to. This beading serves to strengthen the sheet, reducing or preventing liability of same to buckle between the edge corrugations, while, at the same time, keeping a portion of the sheet which overlaps the sheet below in a comparatively flat even plane so as to make close contact with the sheet it overlaps. This beading also provides for a small air space between it and the sheet below it which serves to form a break or stop to the forces of capillary attraction as it has been found that this air space arranged substantially parallel to the exposed edge of the sheet overlapping the sheet below while permitting the forces of capillary attraction to function from the edge of the sheet to the point of the beading, or air space formed thereby, because of this air space capillary forces are broken at that point and there is no danger of water or moisture passing above this air space and beyond the edge of the underlying sheet.

In the drawing forming a part hereof,

Figure 1:
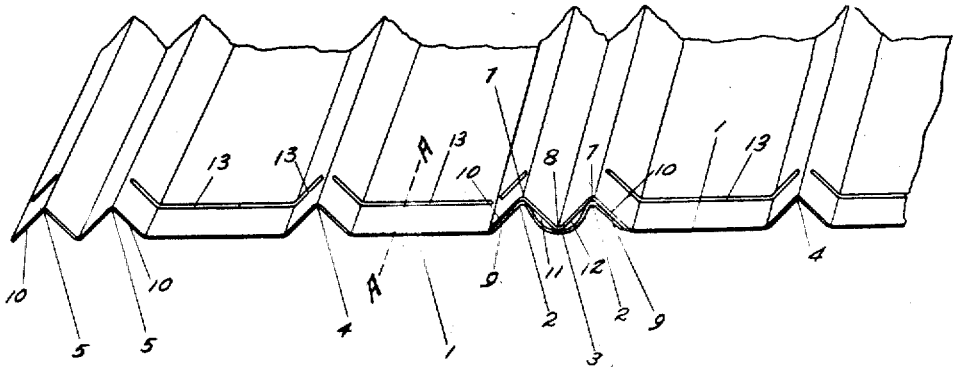
Fig. 1 is a sectional view showing two sheets of corrugated metal roof construction.

In the drawing in which like characters refer to like parts, 1 is a sheet of metal having a series of corrugations, the corrugations 2, 2 being arranged at one end and having a valley 3 between them, corrugations 4 arranged near the center of the sheet and corrugations 5, 5 arranged near the opposite edge of the sheet with a valley 8 between them. It will be noted that the pair of corrugations 2, 2 with the valley between them are of a different formation from the corrugations 5, 5 with the valley 8 between them. The apex of the corrugations 2, 2 and the outer or extreme legs 9, 9 of the corrugations 2, 2 are complements of the corrugations 5, 5 and the extreme legs 10, 10. The valley 3 is at its base wider than valley 8 and the sides of the corrugations 2, 2 forming the valley 3 are longer than the sides of the corrugations 5, 5 forming the valley 8.

Figure 2:
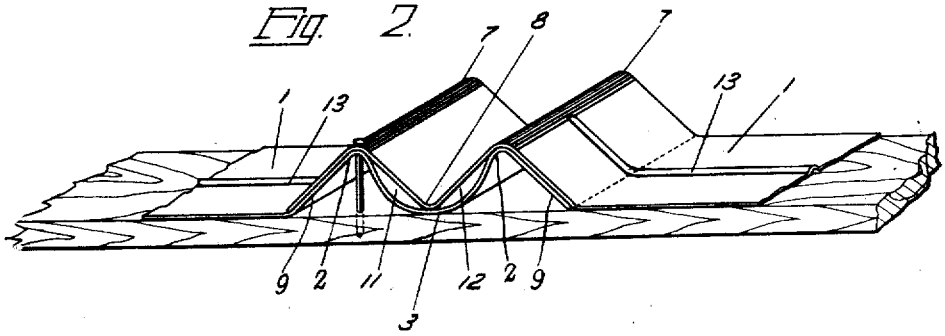
Fig. 2 is a perspective view of the same formed by the overlapped portions of two metal sheets.

When the metal sheets are assembled and nailed as shown a waterproof seal can be formed between the sheets by water in the valley 3 contacting with the lower side of valley 8. When these sheets are overlapped in the manner stated, the apex of the corrugations 5, 5 rests upon the apex of the corrugations 2, 2 and the valley 8 between the corrugations 5, 5 rests upon, and contacts with, the valley 3 between the corrugations 2, 2. This valley 3 and the valley 8 are both formed so that the extreme lower side is in a line common to the line of the body portion of the sheet 1. The result of this is that as shown in Fig. 2 the body portion of the sheet 1 is supported and rests upon the foundation of the roof or structure and the lower side of the metal forming the valleys 3 and 8 being in a line common to the line of the body portion 1 rests directly upon the foundation of the structure or upon the foundation through the metal resting thereon of the lower sheet. It will be seen that this gives to the apex of each corrugation two sides or legs so arranged that any weight placed upon the apex of the corrugations is transmitted by the legs direct to the foundation without the corrugations of the sheet below being called upon to sustain any portion or all of such weight. This construction greatly strengthens the corrugations and tends to prevent any breaking down of the corrugations or buckling of same when a workman steps thereon or any other weight is placed upon the apex of the corrugations. The extreme legs of the corrugations 5, 5 which overlap the corrugations 2, 2 are arranged parallel so as to contact with the legs 9, 9 of the corrugations 2, 2 but the legs forming the sides of the valley 3 are longer than the legs forming the sides of the valley 8 on the overlapping plate with the result that the underside of the valley 8 contacting and resting upon the bottom of the valley 3 divides the valley 3 into two compartments. It will be seen by reference to the drawing that if water by capillary attraction or otherwise finds its way over the top of the innermost corrugations 2 it passes down and into the passageway 11 and may flow down through that passageway into the gutter. A portion of the water may pass between the bottom of the valley 3 and the bottom of the valley 8 into the passageway 12 and then flow outward into the gutter. In addition, water in the bottom of the valley 3 contacting as it does with the bottom of the valley 3 and the underside of the valley 8 will form a seal closing the passage so that when water enters into the passageway 11 it will, after the water seal referred to has been formed, pass out through the passageway 11 which is inclined toward the roof gutter quickly because of no interruption to its flow. The water seal will retard the passage of water as it creates a greater resistance to flow under the valley 8 into the passageway 12 than the resistance to the flow of the water out of the passageway 11 into the gutter and consequently by reason of the two passageways 11 and 12 it will be impossible for water to find its way over the top of the corrugations 2 at the free edge of the lower sheet and as a result a permanent waterproof joint is established by the corrugations in conjunction with the passageways 11 and 12.

The corrugation 4 serves to form a strengthening rib for the sheet and also to permit expansion and contraction due to temperature changes.

Figure 3:
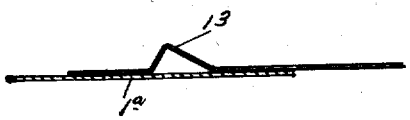
Fig. 3 is a cross section on line A, A of Fig. 1 showing also a portion of the underlying sheet.

In the drawing, I have shown a beading 13 which extends across the sheet transverse to the end corrugations. As shown in Figure 3 this beading 13 is shown in a greatly enlarged cross section arranged above the lower edge of the sheet. In the drawing, Fig. 1, the beading 13 is shown as extending from a point slightly above the lower edge of the sheet and extending upward on the outer legs 10, 10 of the corrugations 5, 5 across the sheet up the left leg of corrugation 4 to a point adjacent the apex and from a point adjacent the apex on the opposite leg of the corrugations 4 down and across the sheet to a point adjacent the first leg 9 of the corrugations 2, 2. It will be noted that the beading 13 does not pass up to, or over, the apex of the corrugations and also that it is preferred not to have any beading on the legs of the corrugations 2, 2. This beading serves to strengthen the flat portions of the sheet, particularly between the corrugations, and maintains same in an even plane so that when overlapping the sheet below the two sheets remain in close contact, thereby tending to seal the roof against leakage. However, where, as in this type of roofing, two sheets are in contact, moisture by capillary attraction passing up between the sheets can not pass beyond the air space formed by the beading 13 as the air space breaks the forces of capillary attraction and prevents moisture or water from passing.

While I have shown in the drawing the beading extending down the extreme outer leg 10 from near the apex of the corrugations to a point near the lower end of the leg, this portion of the beading may at times be omitted.

While in the drawing I have shown the beading 13 at the lower end of the strip with the symmetrical corrugations on the left of the sheet, if desired the beading could be placed on the other end of the sheet, that is, with the symmetrical corrugations 5, 5 at the right and the beading 13 near the lower end of the sheet when these corrugations 5, 5 are so arranged. Because of the corrugations on opposite edges of the sheet not being symmetrical, it is important to have the beading on the sheet always arranged adjacent the same end of each sheet.

I claim:

1. In a construction a pair of members one overlapping the other, each of said members provided with a plurality of parallel corrugations, the extreme sides of the corrugations on one member arranged so as to register with the extreme sides of the corrugations of the other member when the corrugations are overlapped, the adjacent sides of the valley between corrugations on the two members being non-registering and the valley between corrugations of the overlapping member contacting with the bottom of the valley of the under member, all so arranged as to provide a plurality of enclosed passageways between the two members.

2. In a construction a pair of members one overlapping the other, each of said members provided with parallel corrugations of dissimilar contour so arranged as to provide a plurality of enclosed passageways between the corrugations, all so arranged that the apex of each of the overlapping corrugations is supported by four continuous sides extending from the apex to the base of the corrugation.

3. In a construction a pair of members one overlapping the other, each of said members provided with parallel corrugations of dissimilar contour so arranged as to provide a plurality of enclosed passageways between the corrugations, all so arranged that the apex of each of the overlapping corrugations is supported by four continuous sides extending from the apex to the horizontal portion of the member.

4. In a roofing construction a pair of members, one of said members overlapping the other, each having a flat portion and parallel corrugations along adjacent edges, the sides of each corrugation extending from the apex of the corrugation down to a point in a plane common to the flat portion of the member, the extreme sides of the corrugations on the overlapping member being arranged parallel to, and in contact with, the extreme sides of the corrugations of the underlying member, the adjacent sides of the corrugations of the overlapping member being spaced apart from the adjacent sides of the underlying member.

5. In a roofing construction a pair of members, one of said members overlapping the other, each having a flat portion and parallel corrugations along adjacent edges, the sides of each corrugation extending from the apex of the corrugation down to a point in a plane common to the flat portion of the member, the extreme sides of the corrugations on the overlapping member being arranged parallel to, and in contact with, the extreme sides of the corrugations of the underlying member, the adjacent sides of the corrugations of the overlapping member being spaced apart from the adjacent sides of the underlying member, all so arranged to provide a plurality of enclosed passageways between adjacent overlapping corrugations.

6. In a roofing a plurality of overlapping sheet metal members, said members having a horizontal portion, parallel corrugations extending upward from said portion, each of said corrugations provided with two diverging legs extending from the apex thereof to a line common to the line of the horizontal portion, the adjacent legs of the corrugations on one member being arranged at an angle different from the adjacent legs of the corrugations on the other member whereby the corrugations of the members overlap and form between the corrugations a plurality of enclosed passages.

7. In a sheet metal roofing member, a flat body portion, a pair of parallel corrugations adjacent opposite edges thereof extending upward from said body portion, the corrugations adjacent one edge being complementary to the corrugations adjacent the other edge except that the adjacent legs of one pair of corrugations are not complemental to the adjacent legs of the other pair of corrugations, each of the corrugations having two legs extending from the apex of the corrugation to a line common to the line of the body portion.

8. In a roofing, a pair of members, one of which overlaps the other, the lower member provided with a pair of corrugations, the upper member provided with a portion overlapping said pair of corrugations to provide an enclosed valley between said corrugations and means carried by the overlapping portion of said upper member contacting said lower member and dividing said enclosed valley into a plurality of enclosed passageways.

9. In a roofing, a pair of members arranged in an inclined position, one of which overlaps the other, the lower member provided with a pair of corrugations at an angle to the lowest edge of said member, the upper member provided with a portion overlapping said pair of corrugations to provide an enclosed valley between said corrugations and means carried by the overlapping portion of said upper member contacting said lower member and dividing said enclosed valley into a plurality of enclosed passageways.

10. In a sheet metal roofing, a flat body portion provided with two separate sets of corrugations arranged in pairs, each pair of corrugations having a valley between the corrugations, the lowest portion of which is in a line common to the line of the body portion, the top or apex of each of the said corrugations being in a line common to each other, and the adjacent sides of one pair of corrugations being of greater length from the apex of the corrugation to the body portion than the opposite side of said corrugations.

11. In a roofing sheet, corrugations arranged adjacent two opposite edges thereof with a plane surface therebetween, a beading arranged transverse to said corrugations and extending from a point adjacent the apex on one corrugation across the roofing between two corrugations to a point adjacent the apex of another corrugation on the opposite side to provide an enclosed air space between the sheet and the portion of the construction which it overlaps.

12. In a construction member a flat body portion disposed between spaced apart corrugations and means extending across the body portion from a point near the apex of one corrugation to a point near the apex of a corrugation on the opposite side of the body portion for interrupting the forces of capillary attraction between said member and the next underlying member when in use.

13. In a roofing, a pair of members, one of which overlaps the other, each of said members provided with a pair of corrugations adjacent their edges so that the corrugations on the adjacent edges of said members engage with each other, each of said members provided with means arranged transverse to the corrugations in the portion of the member that overlaps the underlying member, said means extending across the member from a point adjacent the apex of one corrugation to a point adjacent the apex of another corrugation said means adapted to interrupt the forces of capillary attraction between the contacting surfaces of the overlapping and the underlying members.

14. In a roofing, a pair of members, one of which overlaps the other, the lower member provided with a pair of corrugations, the upper member provided with a portion overlapping said pair of corrugations to provide an enclosed valley between said corrugations and means carried by the overlapping portion of said upper member dividing said enclosed valley into a plurality of enclosed passageways, each of said members provided with a relatively small corrugation or beading transverse to the first mentioned corrugations so arranged as to provide below such small corrugations an air space between the member and the underlying construction when in use.

15. In a sheet metal roofing member, a flat body portion, a pair of parallel corrugations adjacent opposite edges thereof extending upward from said body portion, the corrugations adjacent one edge being complementary to the corrugations adjacent the other edge except that the adjacent legs of one pair of corrugations are not complementary to the adjacent legs of the other pair of corrugations, each of the corrugations having two legs extending from the apex of the corrugation to a line common to the line of the body portion, and a relatively smaller single corrugation arranged transverse to said parallel corrugations across the flat portion of the body.

16. In a sheet metal roofing member, a flat body portion, a pair of parallel corrugations adjacent opposite edges thereof extending upward from said body portion, the corrugations adjacent one edge being complementary to the corrugations adjacent the other edge except that the adjacent legs of one pair of corrugations are not complementary to the adjacent legs of the other pair of corrugations, each of the corrugations having two legs extending from the apex of the corrugation to a line common to the line of the body portion, and a relatively smaller single corrugation arranged transverse to said parallel corrugations across the flat portion of the body and extending up the legs of one or more corrugations but not over the apex thereof.

17. In a building covering composed of overlapping metal members, each of said members overlapping a like member in the same row and another member in the row below, each member provided with corrugations arranged along their side edges so that the corrugations may be overlapped with the next adjacent member in the same row, and each member also provided with means arranged transversely to the aforesaid corrugations and up the leg of and to a point adjacent to the apex of one of the corrugations on each side edge so as to provide an air space parallel to, but inward from, one of the uncorrugated edges of the flat portion of the member and between said member and the flat portion of the underlying adjacent member in the next row and between one leg of a corrugation and a leg of the underlying corrugation.

18. In a sheet metal roofing, a flat body portion provided with two separate sets of corrugations arranged in pairs, each pair of corrugations having a valley between the corrugations, the lowest portion of which is in a line common to the line of the body portion, the side of one of the corrugations forming the valley between a pair of corrugations being longer from the apex of the corrugation to the base than the corresponding side forming the valley between the other pair of corrugations.

19. In a roofing sheet, corrugations arranged adjacent opposite edges thereof, a beading arranged transverse to said corrugations extending substantially across the sheet from a point adjacent the apex of one corrugation on one edge to a point adjacent the apex of the next corrugation, said beading adapted to provide an enclosed space between contacting portions of the next adjacent member.

20. In a metal construction member, a body portion disposed between spaced apart corrugations and means extending substantially across the member from a point adjacent the apex of one corrugation to a point adjacent the apex of the other corrugation for interrupting the forces of capillary attraction between said member and the contacting body portion of the next adjacent member.

21. In a construction, a pair of members, each provided with corrugations arranged in sets, one member overlapping the other, each of said members provided with a pair of corrugations of dissimilar contour associated with corrugations on the overlapped member and so arranged as to provide a plurality of enclosed passageways between a pair of corrugations of the underlying member.

22. In a metal construction member, a body portion disposed between spaced apart corrugations, means extending across the member from points adjacent the apexes of the adjacent spaced apart corrugations for interrupting the forces of capillary attraction between said member and the contacting body portion of the next adjacent member, said means permitting the body portions of adjacent members to be in contacting relation.

23. A sheet metal roofing comprising overlapping courses including roofing members, each of which is provided with a body portion disposed between spaced apart corrugations and means extending across the body portion from points adjacent the apexes of adjacent spaced apart corrugations for interrupting the forces of capillary attraction between said member and the contacting body portion of the next adjacent member, said overlapping courses being in contact on opposite sides of the capillary interrupting means.

24. A roofing comprising overlapping courses including roofing sheets, each of which have corrugations arranged adjacent two opposite edges thereof, and a beading arranged transversely to said corrugations and extending from a point adjacent the apex of the corrugation on one edge to a point adjacent the apex of the corrugation on the other edge, said beading on one sheet being contacted with a non-beaded portion of an overlapping sheet to provide an air space between contacting portions of the overlapping members.

25. In a sheet metal roofing member, a flat body portion, a pair of parallel corrugations adjacent opposite edges thereof extending upward from said body portion, the corrugations adjacent the other edge, each of the corrugations having two legs extending from the apex of the corrugation to a line common to the line of the body portion, and a relatively smaller single corrugation arranged transverse to said parallel corrugations across the flat portion of the body to a point adjacent the apex of one corrugation of each pair.

26. In a sheet metal roofing member, a flat body portion, a pair of parallel corrugations adjacent opposite edges thereof extending upward from said body portions, the corrugations adjacent one edge being dissimilar to the corrugations adjacent the other edge, each of the corrugations having two legs extending from the apex of the corrugation to a line common to the line of the body portion, and a relatively smaller single corrugation arranged transverse to said parallel corrugations across the flat portion of the body and extending up the legs of one or more corrugations but not over the apex thereof.

27. In a roofing sheet a body portion, a corrugated portion, a beading arranged transverse to said corrugation extending entirely across the body portion and up the leg of the corrugation to a point intermediate the base of the leg and the apex of the corrugation to provide an air space between the sheet and the portion of the construction which it overlaps, thereby providing means for interrupting the forces of capillary attraction.

28. In a roofing sheet a body portion, corrugations on opposite sides of said body portion, a beading transverse to said corrugations extending entirely across the said body portion and up one of the legs of the corrugations on the opposite sides of the body portion to a point intermediate the base of the leg and the apex of the corrugation to provide an air space between the sheet and the portion of the construction which it overlaps, thereby providing means for interrupting the forces of capillary attraction.

29. In a metal roofing sheet a body portion, a corrugated portion, a beading arranged transversely to the corrugated portion, extending entirely across the body portion and into the leg of the corrugation to provide an air space across the sheet and into the leg of the corrugation between the sheet and the portion of the construction which it overlaps, thereby forming means for interrupting the forces of capillary attraction.

30. In a metal construction member, a body portion disposed between spaced apart corrugations, means extending across the member to a point on the leg of the corrugations for interrupting the forces of capillary attraction between said member and the contacting body portion of the next adjacent member, said means permitting the body portions of adjacent members to be in contacting relation.

31. In a construction member, a body portion disposed between spaced apart corrugations, means extending across the member to a point on the legs of the corrugations intermediate the base thereof and the apex of said corrugation for interrupting the forces of capillary attraction between said member and the contacting body portion of the next adjacent member, said means permitting the body portions of adjacent members to be in contacting relation.

32. In a roofing sheet, a body portion, a corrugated portion, a beading arranged transverse to said corrugation extending entirely across the body portion and up the leg of the corrugation to a point intermediate the base of the leg and the apex of the corrugation to provide an air space between the sheet and the portion of the construction which it overlaps, thereby providing means for interrupting the forces of capillary attraction, said means permitting the body portion on opposite sides of said means to contact with adjacent portions of a construction which the sheet may overlap.

33. In a metal construction member, a body portion, a corrugated portion adjacent an edge of said member, said body portion having portions normally extending upward from the lower plane of the body portion, and a beading arranged transversely of the body portion and of the corrugated portion, said beading being adjacent the exposed edge to be in the overlapping end and extending across the body portion and into a portion of the body portion that is normally elevated above the lower plane of the body to provide an air space between the member and the contacting portions of an adjacent structure.

34. In a metal construction member, an intermediate portion, an adjacent portion gradually elevated above the plane of the intermediate portion and means arranged transversely to the intermediate portion and into the gradually elevated portion, said means interrupting the forces of capillary attraction between said member and an adjacent underlapped contacting member.

35. In a metal construction member, a body portion adapted to contact with a body portion of a similarly constructed member and spaced between portions gradually rising above the horizontal plane of the body portion, one of said portions terminating in a portion adapted to overlap a similar construction member, means extending transversely across the body and into said portion gradually rising above the horizontal plane of the member, said means providing a space on the underside of the member above the plane of the undersurface adapted to provide an air space on the underside of said member to interrupt the forces of capillary attraction between said member and the next underlapped.

36. In a metal roofing sheet, a body, a portion of said body arranged in a horizontal plane and adapted to contact with a body portion of a similarly constructed member, portions of said body extending upward away from said horizontal plane and terminating in the apex of a corrugation, means extending across the member to a point on the adjacent portion which gradually departs from the horizontal plane, said means providing a space offset from the plane of the contacting body portion for interrupting the forces of capillary attraction between said member and the contacting body portions of the next adjacent member.

HOWARD J. LITTLE.

CERTIFICATE OF CORRECTION.

Reissue No. 19,880. March 3, 1936.

HOWARD J. LITTLE.

It is hereby certified that error appears in the printed specification of the above numbered patent requiring correction as follows: Page 5, second column, line 20, claim 35, strike out the word "next" and after "underlapped" and before the period insert member; and that the said Letters Patent should be read with these corrections therein that the same may conform to the record of the case in the Patent Office.

Signed and sealed this 31st day of March, A. D. 1936.

Leslie Frazer

Seal) Acting Commissioner of Patents.